United States Patent
Bowen et al.

(10) Patent No.: US 8,412,244 B2
(45) Date of Patent: Apr. 2, 2013

(54) RECEIVE DIVERSITY AND MULTIPLE INPUT MULTIPLE OUTPUT (MIMO) USING MULTIPLE MOBILE DEVICES

(75) Inventors: Toby John Bowen, Durham, NC (US); Anthony Sammarco, Raleigh, NC (US)

(73) Assignee: Sony Mobile Communications AB, Lund (SE)

( * ) Notice: Subject to any disclaimer, the term of this patent is extended or adjusted under 35 U.S.C. 154(b) by 1164 days.

(21) Appl. No.: 12/265,897

(22) Filed: Nov. 6, 2008

(65) Prior Publication Data

US 2009/0170455 A1    Jul. 2, 2009

Related U.S. Application Data

(60) Provisional application No. 61/017,191, filed on Dec. 28, 2007.

(51) Int. Cl.
  *H04B 15/00* (2006.01)
  *H04B 1/06* (2006.01)
(52) U.S. Cl. ........ 455/502; 455/133; 455/137; 455/273; 455/277.1
(58) Field of Classification Search ............. 455/7, 11.1, 455/15, 16, 502, 132, 133, 134, 135, 137, 455/273, 277.1, 277.2; 375/347
See application file for complete search history.

(56) References Cited

U.S. PATENT DOCUMENTS 6,665,521 B1 * 12/2003 Gorday et al. ............. 455/67.11
2007/0135151 A1   6/2007 Dendy

FOREIGN PATENT DOCUMENTS

| EP | 1592185 | 11/2005 |
|---|---|---|
| WO | 2007003034 | 1/2007 |
| WO | 2007116398 | 10/2007 |

OTHER PUBLICATIONS

Japanese Patent Office; Second Office Action; Apr. 24, 2012; issued in Japanese Patent Application No. 2010-540688.
Japanese Patent Office; Office Action; Dec. 16, 2012; issued in Japanese Patent Application No. 2010-540688.
International Preliminary Report on Patentability, corresponding to International Patent Application No. PCT/US2008/083186, dated Mar. 15, 2010.
International Search Report, corresponding to International Patent Application No. PCT/US2008/083186, dated Apr. 1, 2009.
Written Opinion, corresponding to International Patent Application No. PCT/US2008/083186, dated Apr. 1, 2009.

* cited by examiner

*Primary Examiner* — Nguyen Vo
(74) *Attorney, Agent, or Firm* — Patrick B. Horne; Moore & Van Allen PLLC (57) ABSTRACT

A mobile device that includes an antenna, an interface, and an application. The antenna is capable of receiving a signal. The interface is capable of receiving a second signal in synchronization with the signal and the application is configured to perform receive diversity processing using the signal and the second signal. Further, is included a mobile device that includes the antenna, the interface, and a second application where the second application is configured to perform multiple input multiple output (MIMO) processing using the signal and the second signal. Increased bandwidth and processing gain is achieved for the received signal by the receive diversity processing and the MIMO processing.

19 Claims, 10 Drawing Sheets

RECEIVE DIVERSITY AND MULTIPLE INPUT MULTIPLE OUTPUT (MIMO) USING MULTIPLE MOBILE DEVICES

This application claims priority to provisional patent application Ser. No. 61/017,191, filed Dec. 28, 2007, the content of which is herein incorporated by reference in its entirety.

BACKGROUND OF THE INVENTION

The present invention is related to receive diversity and multiple input multiple output, and more specifically to receive diversity and multiple input multiple output using multiple mobile devices.

Currently, there are different techniques to improve a received signal quality and/or increase the bandwidth of a transmission. Receive diversity is one technique that uses two or more receivers in a wireless or mobile device to eliminate multi-path signal distortion by either using the signal from the antenna with the best signal to noise ratio, or using an incoming signal being received on both antennas and using the good portions from a first antenna and the good portions from a second antenna.

In addition, multiple input multiple output (MIMO) techniques may include the use of multiple transmitter antennas and multiple receiver antennas on wireless devices for increasing bandwidth and improving performance. For example, when two transmitting antennas are used and two or more receiving antennas are used, two simultaneous data streams carrying different information can be sent, effectively doubling the data rate and bandwidth.

However, currently problems exist in attempting to add antennas to get additional bandwidth. To increase a data rate on a mobile device by adding additional antennas requires additional space on the mobile device thereby increasing the size of the mobile device. Moreover, a minimum distance is required between antennas to get enough diversity between the two different received signals such that they can be combined else both receive antennas may receive the same signal. Further, the lower the frequency of the received signals, the larger the size of the antennas needed and the more separation required between the two antennas. This requires a further additional increase to the size of the mobile device to support receive diversity processing and MIMO processing for increased bandwidth.

BRIEF SUMMARY OF THE INVENTION

According to one aspect of the present invention, a mobile device includes an antenna, the antenna being capable of receiving a signal, an interface, the interface being capable of receiving a second signal in synchronization with the signal, and an application, the application configured to perform receive diversity processing using the signal and the second signal.

According to another aspect of the present invention, a mobile device includes an antenna, the antenna being capable of receiving a signal, an interface, the interface being capable of receiving a second signal in synchronization with the signal, and an application, the application configured to perform multiple input multiple output (MIMO) processing using the signal and the second signal.

According to a further aspect of the present invention, a method for receive diversity and multiple input multiple output (MIMO) processing in synchronization between at least two devices includes receiving a first signal at a first mobile device, receiving at least one second signal at a second mobile device, transferring the at least one second signal to the first mobile device, performing receive diversity processing using the first signal and the at least one second signal when the at least one second signal comprises a bleed-over signal from the first signal, and performing MIMO processing using the first signal and the at least one second signal when the at least one second signal comprises a signal containing information different from the first signal.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention include a mobile device such as, for example, a mobile phone, Personal Digital Assistant (PDA), laptop computer with wireless modem, etc., that receives a first signal directly and may receive one or more second signals from one or more other devices and synchronously processes the first signal and the one or more second signals to achieve an increased bandwidth and processing gain for the received first signal. The mobile device may achieve the increased bandwidth by performing synchronized receive diversity processing using the first signal and the one or more second signals. Moreover, the mobile device may achieve the increased bandwidth by performing synchronized multiple input multiple output (MIMO) processing using the first signal and the one or more second signals. According to embodiments of the present invention, a mobile device may also perform both synchronized receive diversity processing using the first signal and the one or more second signals and synchronized multiple input multiple output (MIMO) processing using the first signal and the one or more second signals to achieve increased bandwidth/processing gain for the received first signal. The one or more second devices may be also be mobile devices such as, for example, a mobile phone or PDA.

Embodiments according to the present invention may include two or more mobile devices each with a single receiving antenna where the two or more mobile devices may transfer information via a high bandwidth, low latency interface for receive diversity and/or MIMO synchronized processing between the two or more mobile devices. The high bandwidth, low latency interface may also be a low energy short-range interface. The high bandwidth, low latency interface may be any type of wireless high bandwidth interface such as, for example, an ultra wide band (UWB) interface, a microwave interface, a world-wide interoperability for microwave access (WiMAX) interface, a wireless universal serial bus (USB) interface, etc. According to embodiments of the present invention, the soft bits of received information may be shared between mobile devices to provide a processing gain for high data rates. Similarly additional uplink channels may be provided by sending data via the high bandwidth, low latency interface to other mobile devices. Hybrid automatic repeat requests (HARQ) may also be achieved by incremental redundancy techniques using the multiple data channels.

An antenna may be used to transmit or receive information. To help illustrate embodiments of the present invention, the terms "receive antenna" and transmitting antenna" may be used merely to denote a direction of transmission of a signal. These terms do not limit the antenna to either a transmit only or receive only antenna.

Figure 1:
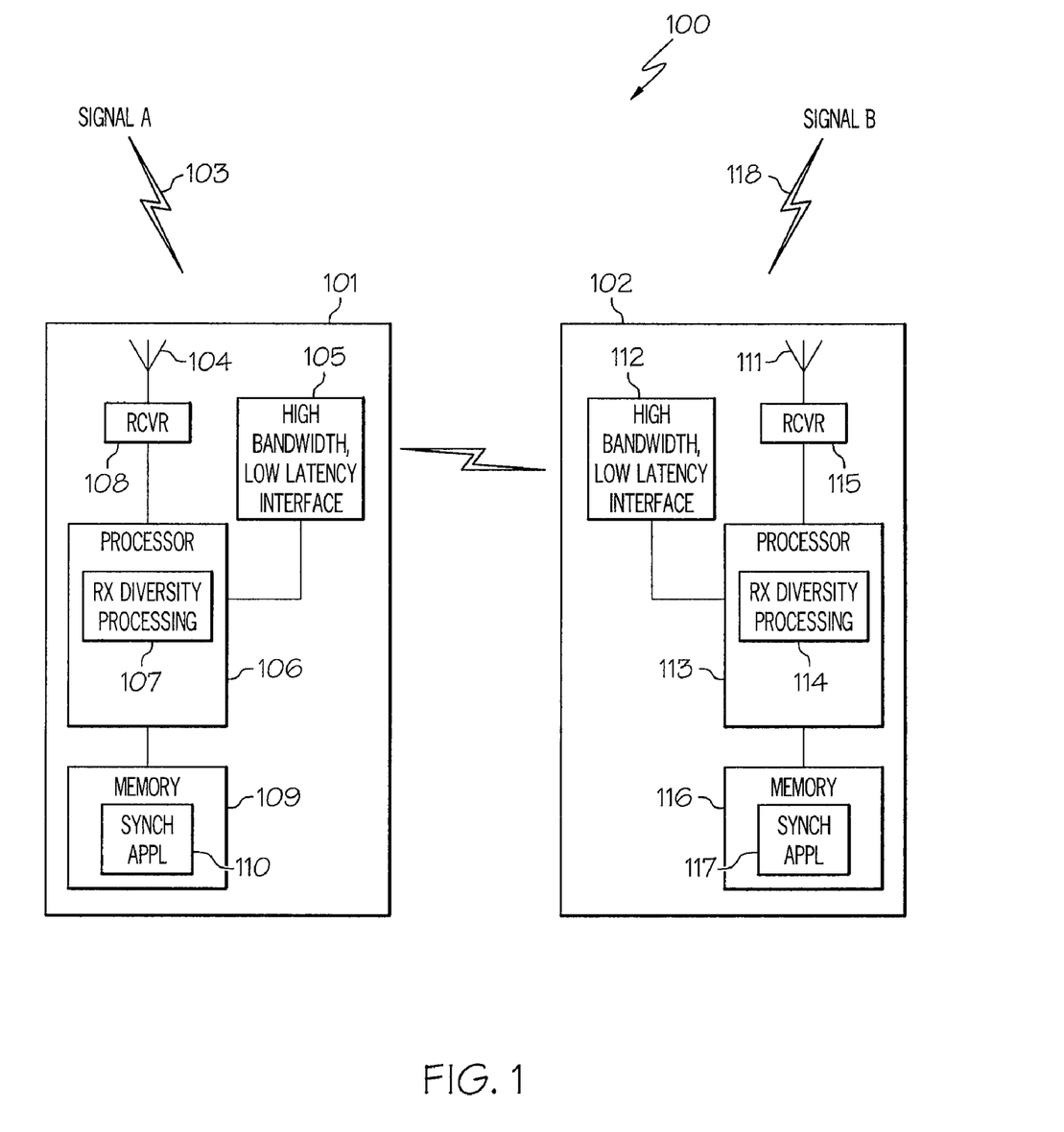
FIG. 1 is a diagram of a system for receive diversity processing according to an exemplary embodiment of the present invention.

FIG. 1 shows a diagram of a system for receive diversity processing according to an exemplary embodiment of the present invention. The system 100 may include a first mobile device 101 and a second mobile device 102. The first mobile device 101 may receive a signal 103 at the receiver 108 via a receiving antenna 104 of the mobile device 101. The demodulated data (soft bits) from the receiver 108 may be passed on to a processor 106. The mobile device 101 may also include a high bandwidth, low latency interface 105 that receives data (soft bits) from the second mobile device 102. This data may also be passed on to the processor 106, and a memory 109 interconnected to the processor 106. The memory 109 may contain a synchronization application 110 that allows for synchronized receive diversity processing with the second mobile device 102. The processor 106 may contain hardware and/or software for performing receive diversity processing

107. The first mobile device 101 may be any type of mobile device such as, for example, a computer (e.g. a laptop computer), a personal digital assistant (PDA), a mobile phone, an audio data receiver, a video data receiver, a satellite data receiver, an electronic game, etc.

Similarly, the second mobile device 102 may receive a second signal 118 at a receiver 115 via a receiving antenna 111 of the mobile device 102. The second mobile device 102 may also include a high bandwidth, low latency interface 112 that sends the demodulated data from the receiver 115 via the processor 113, to the first mobile device 101. The second memory 116 may contain a second synchronization application 117 that allows for synchronized receive diversity processing with the first mobile device 101. The second processor 113 may contain hardware and/or software for performing receive diversity processing 114. The second mobile device 102 may be any type of mobile device such as, for example, a computer (e.g. a laptop computer), a personal digital assistant (PDA), a mobile phone, an audio data receiver, a video data receiver, a satellite data receiver, an electronic game, etc.

The first mobile device 101 may perform receive diversity processing of the first signal 103 and the second signal 118 that has been transmitted from the second mobile device 102 to the first mobile device 101. The first mobile device 101 may receive the second signal 118 and determine whether the second signal 118 is a derivative of the original signal containing the same information as the first signal 103 where receive diversity processing may be performed. The data (soft bits) from the second signal 118 may be transmitted from the second high bandwidth, low latency interface 112 on the second mobile device 102 to the first high bandwidth low latency interface 105 on the first mobile device 101. The second signal 118 may be transmitted via a wired or a wireless transmission. The first synchronization application 110 may be executed by the first processor 106 on the first mobile device 101 and communicate with the second synchronization application 117 on the second mobile device 102 to allow synchronized receive diversity processing on the first mobile device 101 with the second mobile device 102. In this regard, the first mobile device 101 may communicate synchronization information regarding the first signal 103 and/or the second signal 118 that may be used in the receive diversity processing. Moreover, the situation may be reversed where the second mobile device 102 receives the data (soft bits) from the first signal 103 from the first mobile device 101 and performs receive diversity processing using the first signal 103 and the second signal 118.

Synchronization information may be communicated between the first mobile device 101 and the second mobile device 102 via the high bandwidth, low latency interfaces of these devices 105, 112 or via any other wireless interface between these devices. The synchronization information may be communicated over a lower bandwidth type channel. For example, synchronization information may be communicated over an infrared, Bluetooth, or other type channel. The synchronization information allows for synchronized receive diversity processing between the first mobile device 101 and the second mobile device 102. For example, the first mobile device 101 may be a laptop computer that receives the first signal 103 via a modem (not shown) where the first mobile device 101 desires to increase bandwidth of the received first signal 103 and therefore may receive the second signal 118 from the second mobile device 102 allowing increased bandwidth.

Therefore, according to embodiments of the present invention, two mobile devices may be used to perform receive diversity processing with each other. Each mobile device may include only a single receiving antenna and may be capable of performing receive diversity processing of signals. The bandwidth of the data received may be increased, and/or a quality of the received signal improved, by performing receive diversity processing in synchronization with a second mobile device such as a cell phone.

Figure 2:
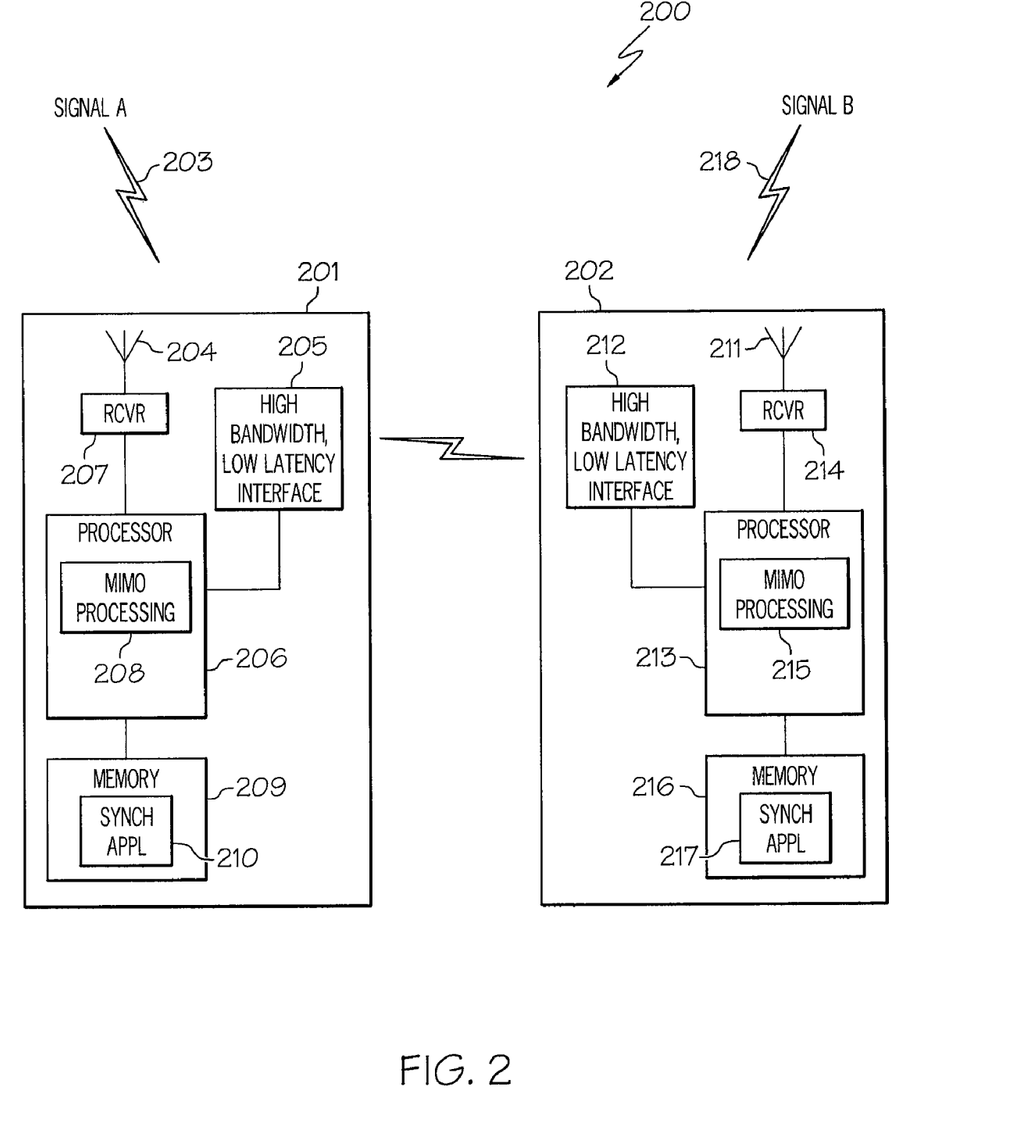
FIG. 2 is a diagram of a system for MIMO processing according to an exemplary embodiment of the present invention.

FIG. 2 shows a diagram of a system for MIMO processing according to an exemplary embodiment of the present invention. The system 200 may include a first mobile device 201 and a second mobile device 202. The first mobile device 201 may receive a signal 203 at a receiver 207 via a receiving antenna 204 of the first mobile device 201. The demodulated data (soft bits) from the receiver 207 may be passed on to a processor 206. The first mobile device 201 may also include a high bandwidth, low latency interface 205 that receives data (soft bits) from the second mobile device 202. This data may also be passed on to a processor 206, and a memory 209 interconnected to the processor 206. The memory 209 may contain a synchronization application 210 that allows for synchronized MIMO processing with the second mobile device 202. The processor 206 may contain hardware and/or software for performing MIMO processing 208. The first mobile device 201 may be any type of mobile device such as, for example, a computer (e.g. a laptop computer), a personal digital assistant (PDA), a mobile phone, an audio data receiver, a video data receiver, a satellite data receiver, an electronic game, etc.

Similarly, the second mobile device 202 may receive a second signal 218 at a receiver 214 via a receiving antenna 211 of the second mobile device 202. The second mobile device 202 may also include a high bandwidth, low latency interface 212 that sends the demodulated data from the receiver 214 via the processor 213 to the first mobile device 201. The memory 216 may contain a second synchronization application 217 that allows for synchronized MIMO processing with the first mobile device 201. The second processor 213 may contain hardware and/or software for performing MIMO processing 215. The second mobile device 202 may be any type of mobile device such as, for example, a computer (e.g. a laptop computer), a personal digital assistant (PDA), a mobile phone, an audio data receiver, a video data receiver, a satellite data receiver, an electronic game, etc.

The first mobile device 201 may perform MIMO processing of the first signal 203 and the second signal 218 that has been transmitted from the second mobile device 202 to the first mobile device 201. The first mobile device 201 may receive the second signal 218 and determine whether the second signal 218 is a signal containing information different from the first signal 203 where MIMO processing may be performed. The second signal 218 may be transmitted from the high bandwidth, low latency interface 212 on the second mobile device 202 to the high bandwidth low latency interface 205 on the first mobile device 201. The second signal 218 may be transmitted via a wired or a wireless transmission. The synchronization application 210 may be executed by the processor 206 on the first mobile device 201 and communicate with the synchronization application 217 on the second mobile device 202 to allow synchronized MIMO processing on the first mobile device 201 with the second mobile device 202. In this regard, the first mobile device 201 may communicate synchronization information regarding the first signal 203 and/or the second signal 218 that may be used in the MIMO processing. Moreover, the situation may be reversed where the second mobile device 202 receives a first signal 203 from the first mobile device 201 and performs MIMO processing at the second mobile device 202 using the first signal 203 and the second signal 218.

Synchronization information may be communicated between the first mobile device 201 and the second mobile device 202 via the high bandwidth, low latency interfaces of these devices 205, 212 or via any other wireless interface between these devices. The synchronization information may be communicated over a lower bandwidth type channel. For example, synchronization information may be communicated over an infrared, Bluetooth, or other type channel. The synchronization information allows for synchronized MIMO processing between the first mobile device 201 and the second mobile device 202. For example, the first mobile device 201 may be a laptop computer that receives the first signal 203 via a modem (not shown) where the first mobile device 201 desires to increase bandwidth of the received first signal 203 and therefore may receive the second signal 218 from the second mobile device 202 allowing increased bandwidth.

Therefore, according to embodiments of the present invention, two mobile devices may be used to perform MIMO processing in synchronization with each other. Each mobile device may include only a single receiving antenna and may be capable of performing MIMO processing of signals. The bandwidth of the data received may be increased, and/or a quality of the received signal improved, by performing MIMO processing in synchronization with a second mobile device such as a cell phone.

Figure 3:
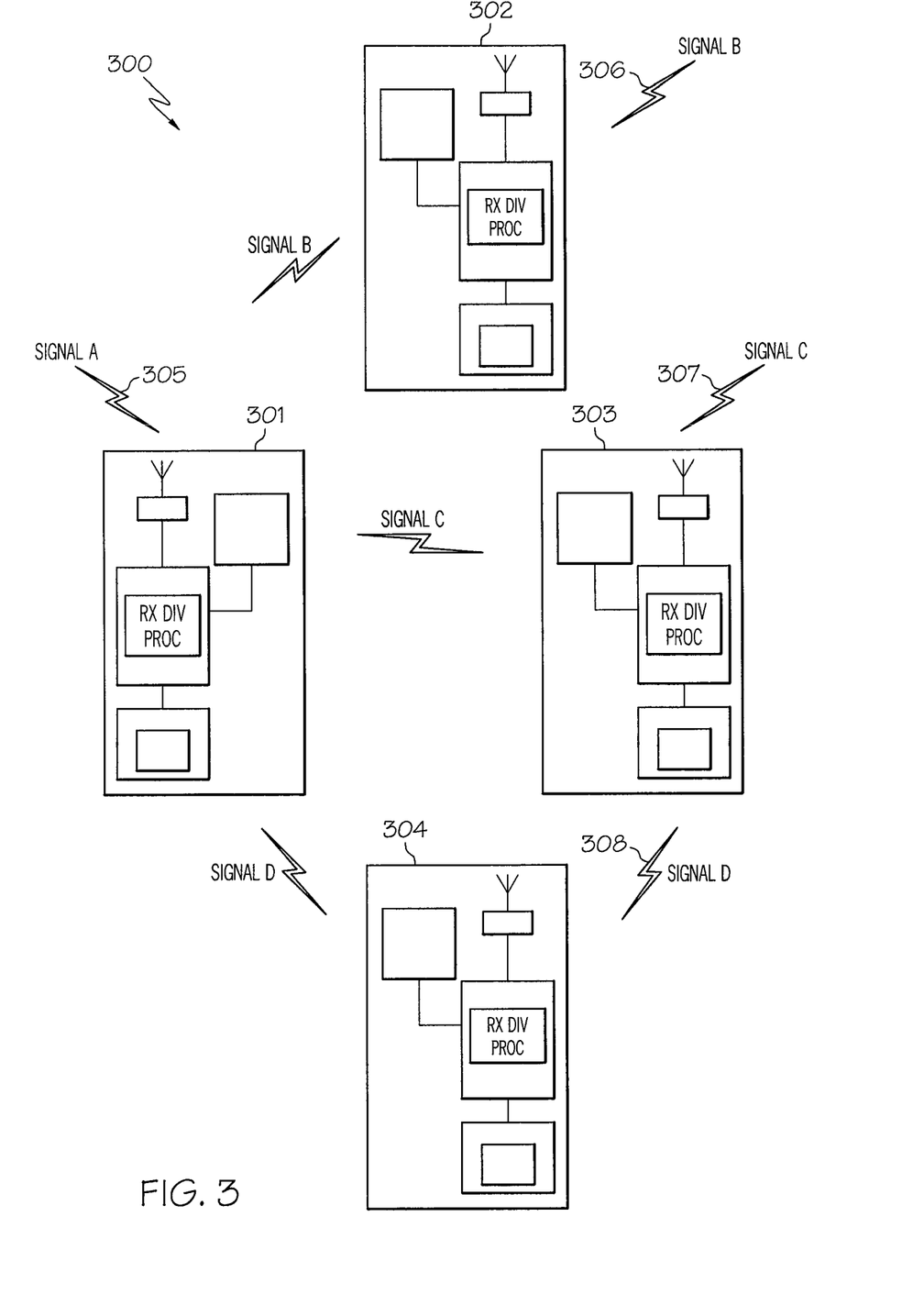
FIG. 3 is a diagram of a system for receive diversity processing with multiple mobile devices according to an exemplary embodiment of the present invention.

FIG. 3 shows a diagram of a system for receive diversity processing with multiple mobile devices according to an exemplary embodiment of the present invention. The system 300 may include a first mobile device 301 that receives a first signal 305, a second mobile device 302 that receives a second signal 306, a third mobile device 303 that receives a third signal 307, and a fourth mobile device 304 that receives a fourth signal 308. Although four mobile devices are shown in this system, embodiments of the present invention are not limited to this number and may include any number of mobile devices. For illustration purposes, the mobile device that performs the receive diversity processing will be referred to as the "master" and mobile devices that send signals to the master mobile device to be used in the receive diversity processing will be referred to as "slaves". However, all mobile devices may have the capability of being a master or a slave. In this exemplary embodiment, the first mobile device 301 is the master device and performs receive diversity processing.

The first mobile device 301 may receive signals from the other mobile devices 302, 303, 304 where each signal is received and used with the first signal 305 to perform receive diversity processing. The master first mobile device 301 receives each signal and determines whether the signal is a derivative of the original signal containing the same information as the first signal 305 where receive diversity processing may be performed. For example, each slave mobile device, i.e., the second mobile device 302, the third mobile device 303, and the fourth mobile device 304, may receive a signal, the second signal 306, the third signal 307, and the fourth signal 308, respectively, where each of the signals may be a derivative of the original signal containing the same information (although possibly delayed) of the first signal 305. The second mobile device 302 may receive a second signal 306 that may be a derivative of the first signal 305. Likewise, the third mobile device 303 and the fourth mobile device 304 may receive and forward signals, the third signal 307 and the fourth signal 308, respectfully, to the first mobile device 301 for receive diversity processing. The more slave mobile devices, the further increase in bandwidth or processing gain that may be achieved.

Figure 4:
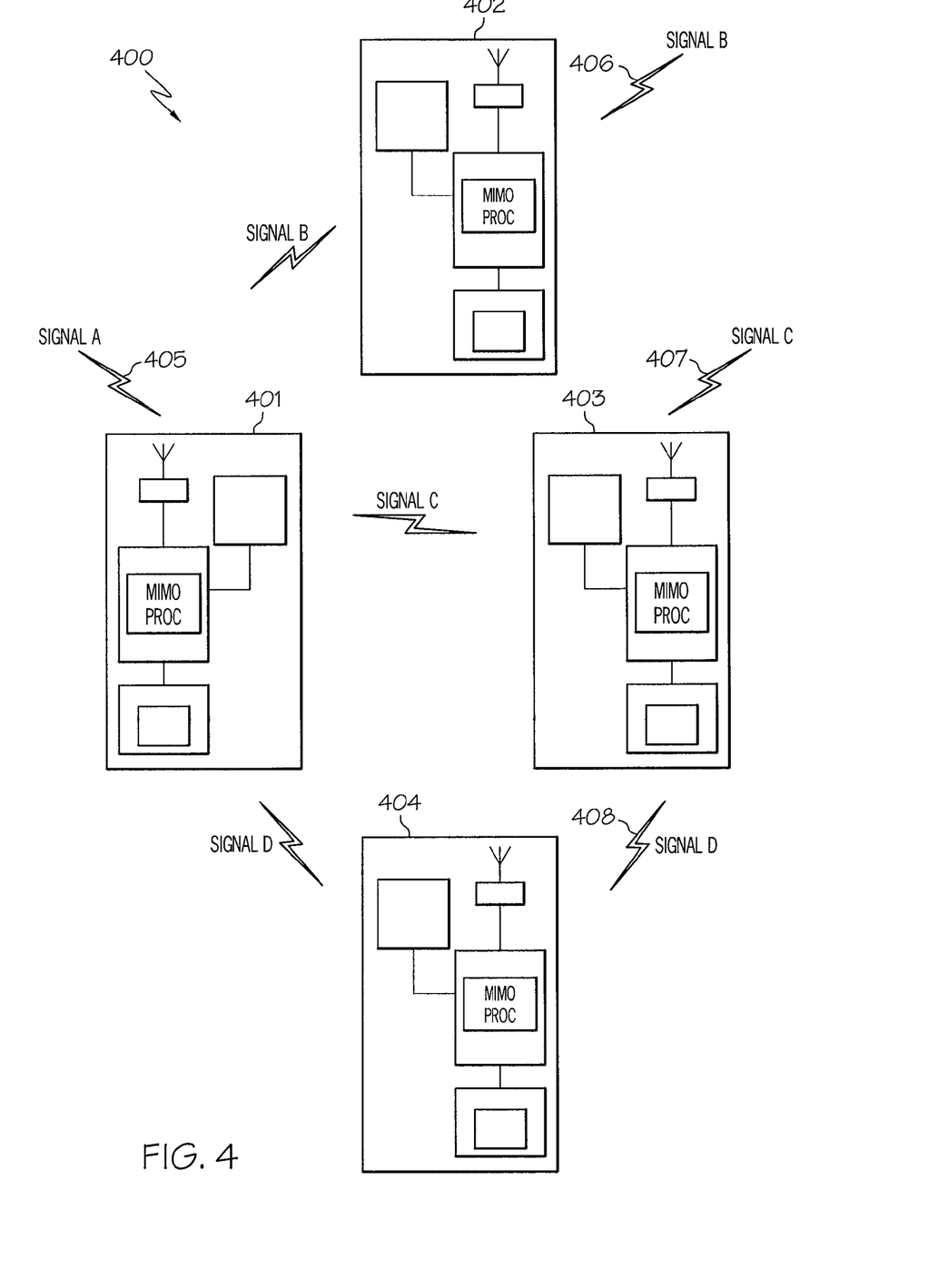
FIG. 4 is a diagram of a system for MIMO processing with multiple mobile devices according to an exemplary embodiment of the present invention.

FIG. 4 shows a diagram of a system for MIMO processing with multiple mobile devices according to an exemplary embodiment of the present invention. The system 400 may include a first mobile device 401 that receives a first signal 405, a second mobile device 402 that receives a second signal 406, a third mobile device 403 that receives a third signal 407, and a fourth mobile device 404 that receives a fourth signal 408. Although four mobile devices are shown in this system, embodiments of the present invention are not limited to this number and may include any number of mobile devices. For illustration purposes, the mobile device that performs the MIMO processing will be referred to as the "master" and mobile devices that send signals to the master mobile device to be used in the MIMO processing will be referred to as "slaves". However, all mobile devices may have the capability of being a master or a slave. In this exemplary embodiment, the first mobile device 401 is the master device and performs receive diversity processing and/or MIMO processing.

The first mobile device 401 may receive signals from the other mobile devices 402, 403, 404 where each signal is received and used with the first signal 405 to perform MIMO processing. The master first mobile device 401 receives each signal and determines whether the signal is a signal containing information different from the first signal 405 where MIMO processing may be performed. For example, each slave mobile device, i.e., the second mobile device 402, the third mobile device 403, and the fourth mobile device 404, may receive a signal, the second signal 406, the third signal 407, and the fourth signal 408, respectively, where the second signal 406, the third signal 407, and the fourth signal 408 may each be a signal containing information completely different from the information contained in the first signal 405. Therefore, the second mobile device 402 may receive a second signal 406 that may be a completely different signal and forward this second signal 406 to the first mobile device 401. Likewise, the third mobile device 403 and the fourth mobile device 404 may receive and forward signals, the third signal 407 and the fourth signal 408, respectfully, to the first mobile device 401 for MIMO processing. The more slave mobile devices, the further increase in bandwidth that may be achieved.

Figure 5:
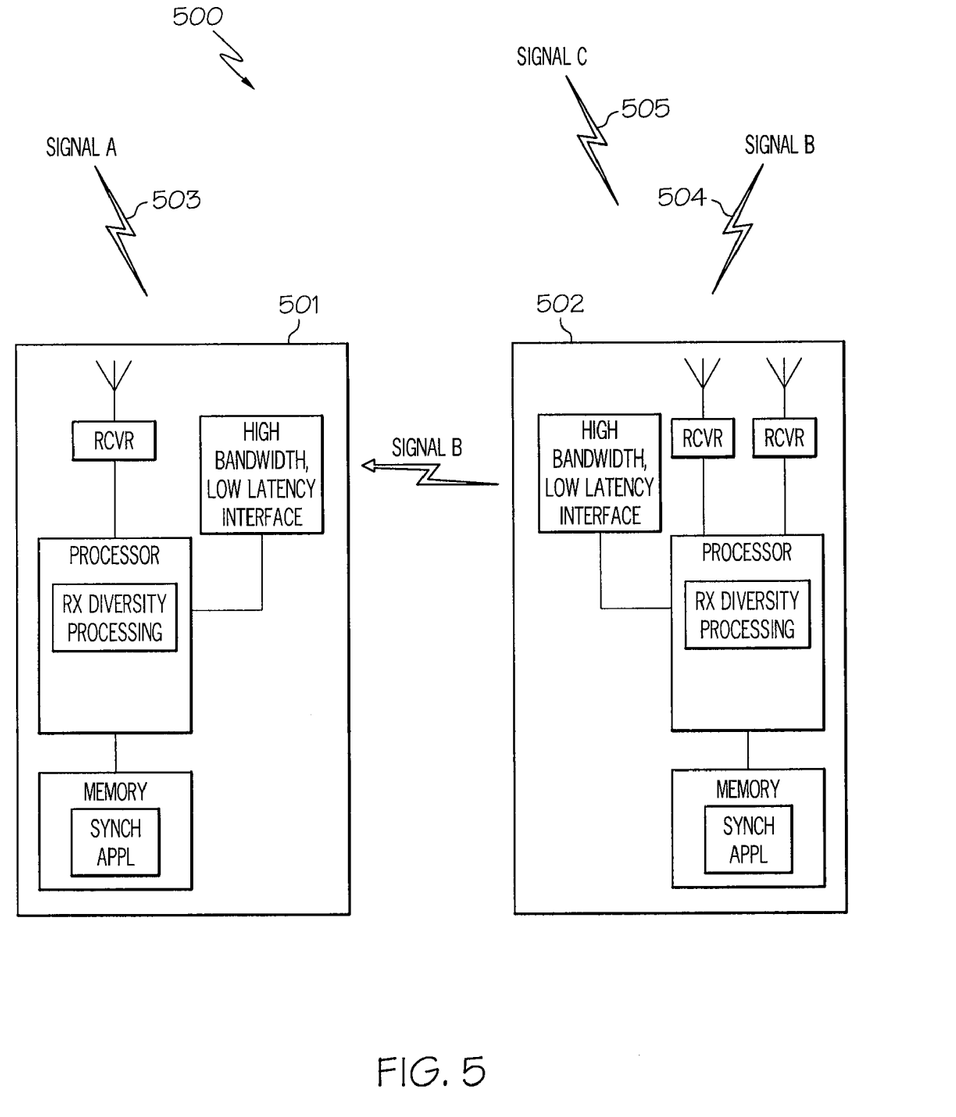
FIG. 5 is a diagram of a system for receive diversity according to another exemplary embodiment of the present invention.

FIG. 5 shows a diagram of a system for receive diversity according to another exemplary embodiment of the present invention. The system 500 may include a first mobile device 501 and a second mobile device 502. The first mobile device 501 may receive a first signal 503 and the second mobile device 502 may receive a second signal 504 and a third signal 505. In this exemplary embodiment, the first mobile device 501 may be the master device that performs receive diversity processing using the first signal 503 and the second signal 504 received from the second mobile device 502. The second mobile device 502 may support synchronized receive diversity processing with the first mobile device 501 while simultaneously receiving and processing the third signal 505. For example, if the second mobile device 502 is a mobile phone, the third signal 505 may be a telecommunications signal such as a telephone call with another device. Although not shown, the first mobile device 501 may also receive another signal that may be processed simultaneously while performing receive diversity processing.

Figure 6:
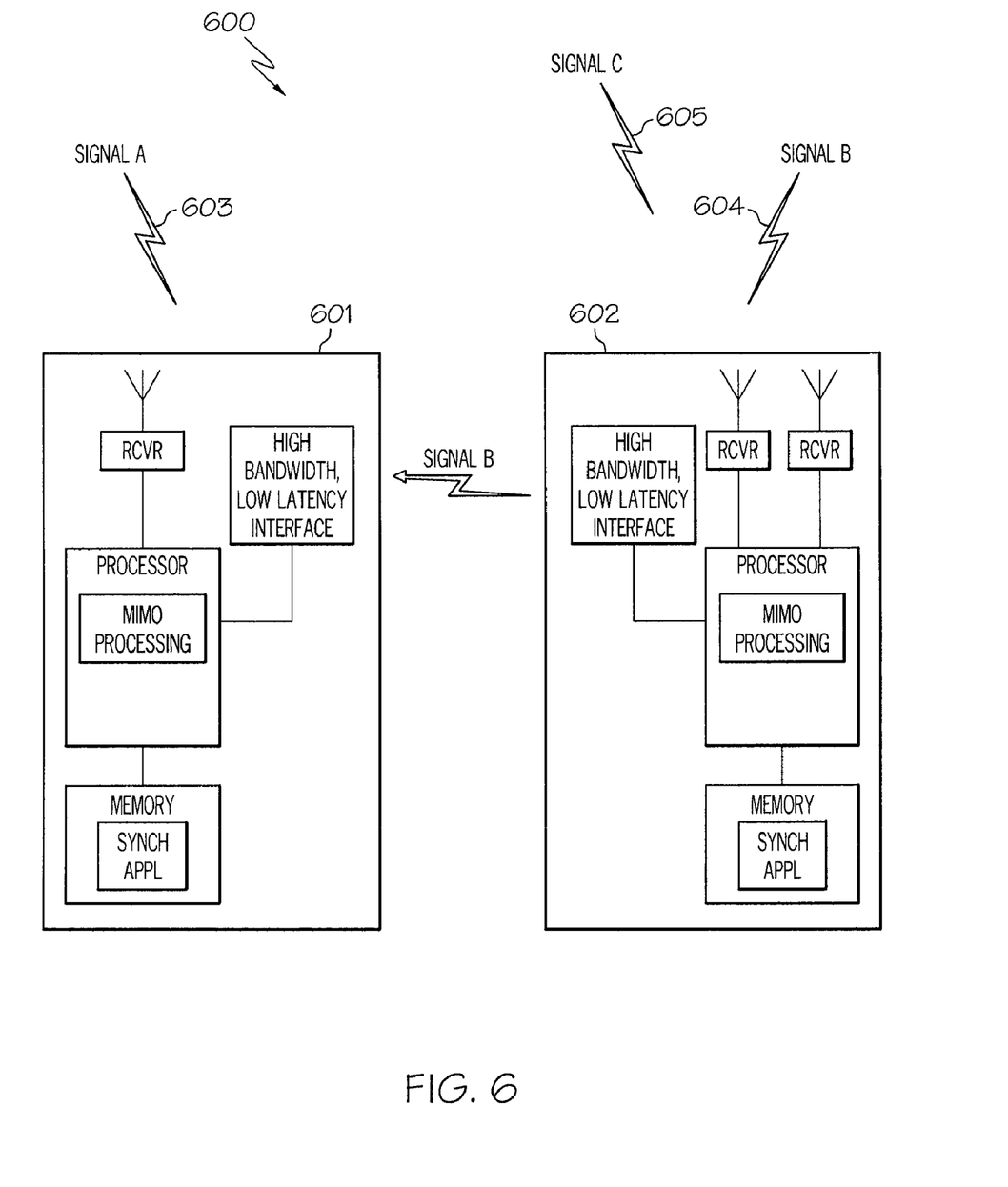
FIG. 6 is a diagram of a system for MIMO processing according to another exemplary embodiment of the present invention.

FIG. 6 shows a diagram of a system for MIMO processing according to another exemplary embodiment of the present invention. The system 600 may include a first mobile device 601 and a second mobile device 602. The first mobile device 601 may receive a first signal 603 and the second mobile device 602 may receive a second signal 604 and a third signal 605. In this exemplary embodiment, the first mobile device 601 may be the master device that performs MIMO processing using the first signal 603 and the second signal 604 received from the second mobile device 602. The second mobile device 602 may support synchronized MIMO processing with the first mobile device 601 while simultaneously receiving and processing the third signal 605. For example, if the second mobile device 602 is a mobile phone, the third signal 605 may be a telecommunications signal such as a telephone call with another device. Although not shown, the first mobile device 601 may also receive another signal that may be processed simultaneously while performing MIMO processing.

Figure 7:
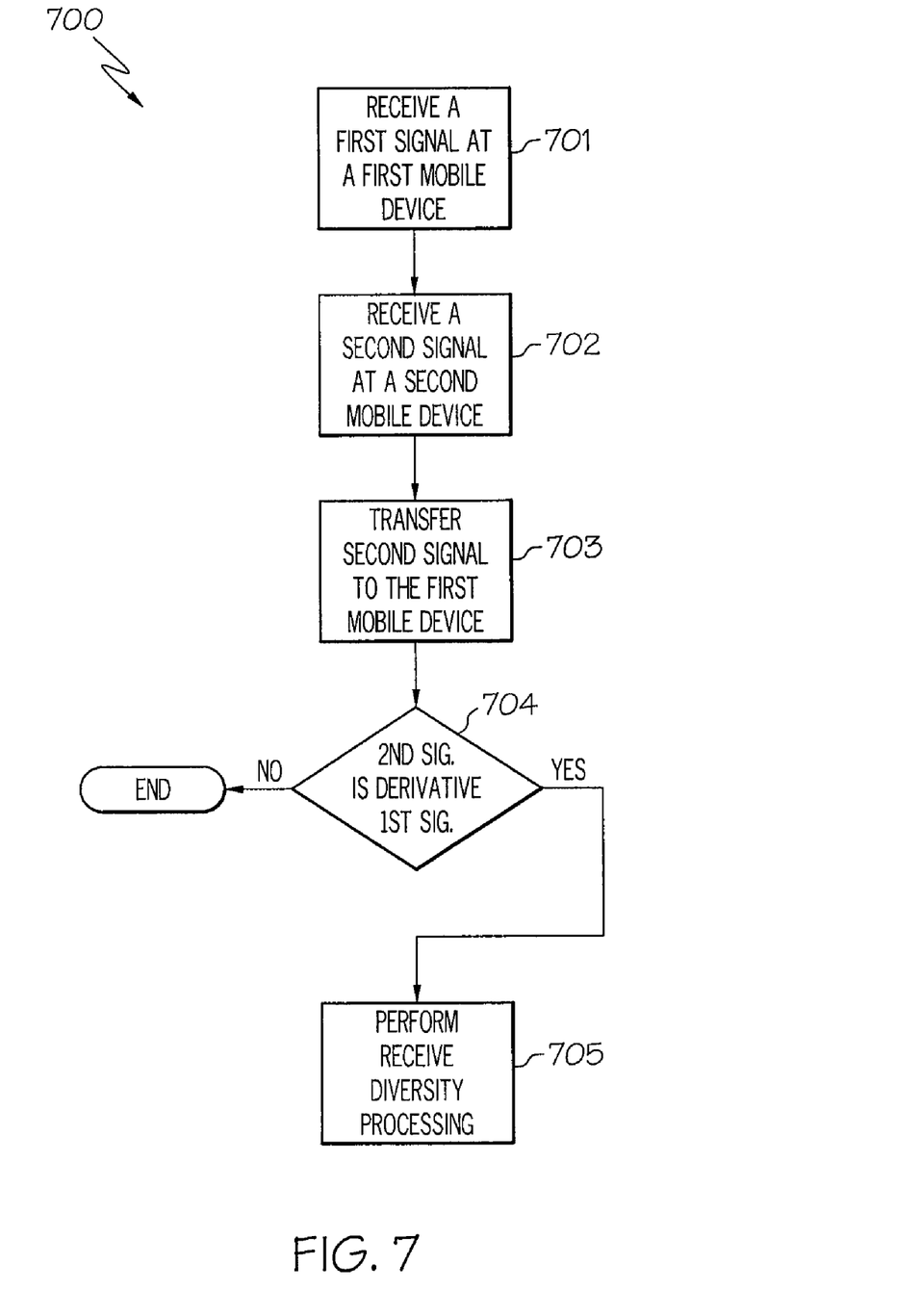
FIG. 7 is a flowchart of a process for receive diversity processing according to an exemplary embodiment of the present invention.

FIG. 7 shows a flowchart of a process for receive diversity processing according to an exemplary embodiment of the present invention. In the process 700 in block 701 a first signal may be received at a first mobile device. In block 702 a second signal may be received at a second mobile device. In block 703 a second signal may be transferred from the second mobile device to the first mobile device. In block 704 it may be determined if the second signal is a derivative of the first signal and if not, the process ends. If the second signal is a derivative of the first signal then in block 705 receive diversity processing may be performed using the first signal and the second signal at the first mobile device.

Figure 8:
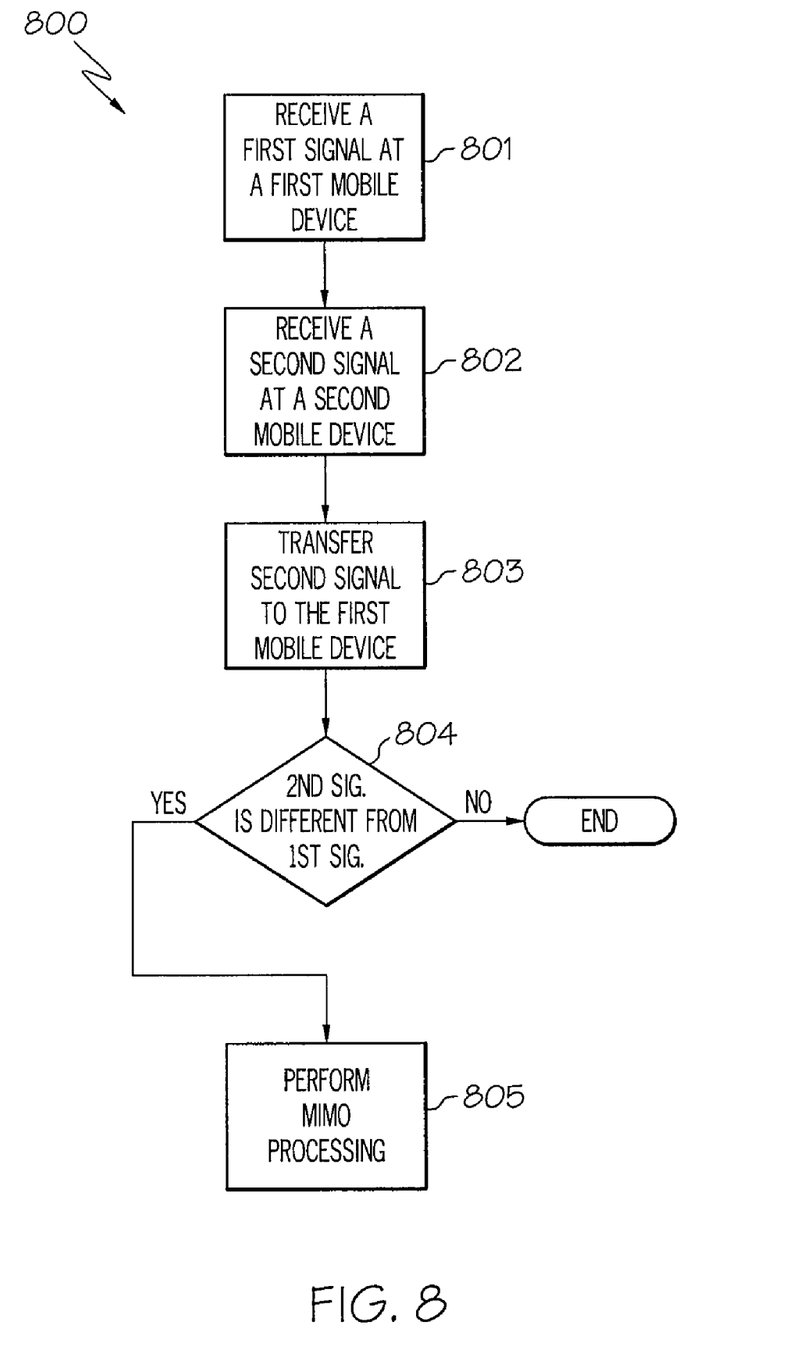
FIG. 8 is a flowchart of a process for MIMO processing according to an exemplary embodiment of the present invention.

FIG. 8 shows a flowchart of a process for MIMO processing according to an exemplary embodiment of the present invention. In the process 800 in block 801 a first signal may be received at a first mobile device. In block 802 a second signal may be received at a second mobile device. In block 803 a second signal may be transferred from the second mobile device to the first mobile device. In block 804 it may be determined if the second signal contains information different from that contained in the first signal and if not, the process ends. If the second signal does contain information different from that contained in the first signal, then in block 805, MIMO processing may be performed using the first signal and the second signal at the first mobile device.

Figure 9:
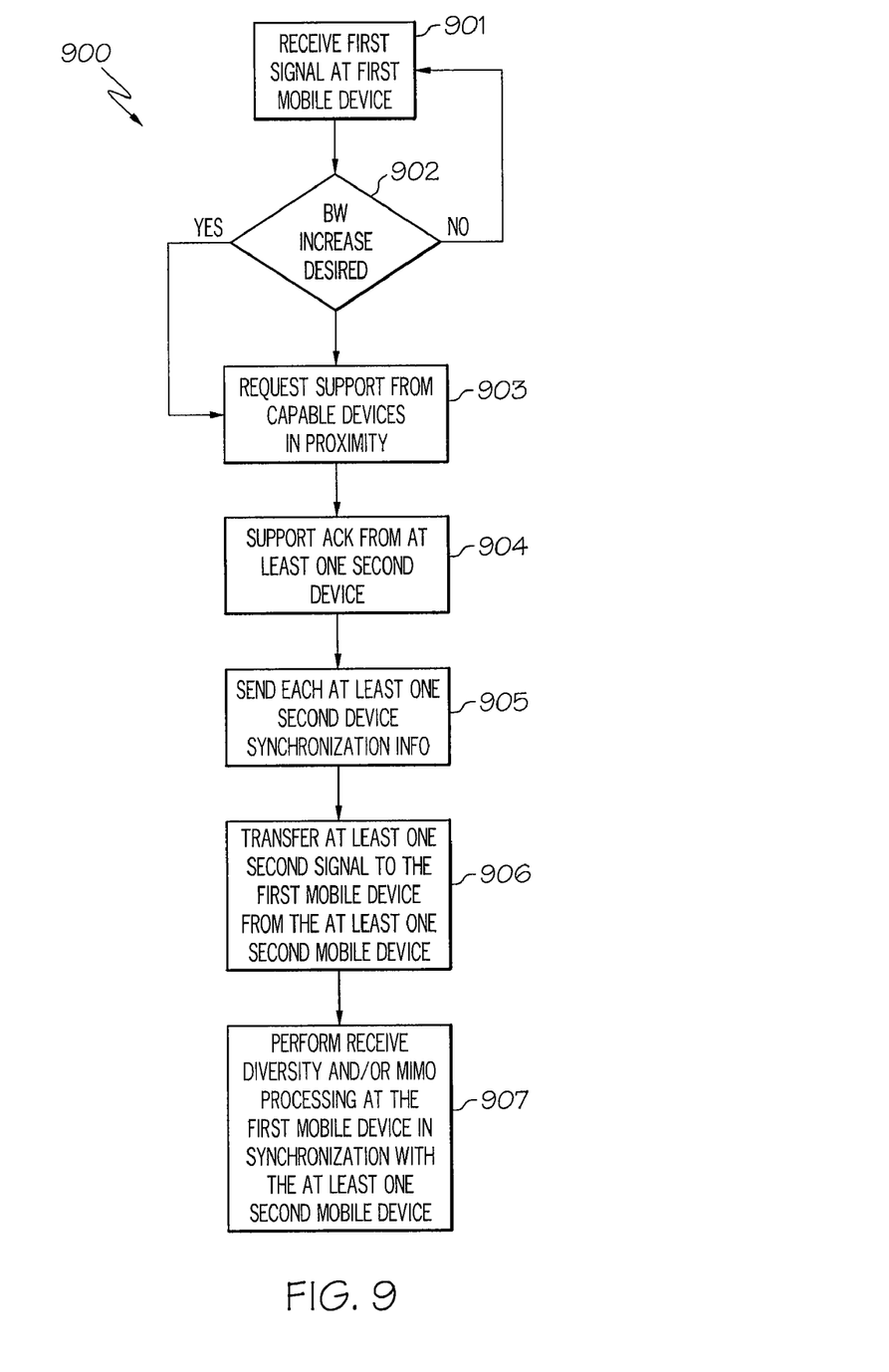
FIG. 9 is a flowchart of a process for increasing bandwidth according to another exemplary embodiment of the present invention.

FIG. 9 shows a flowchart of a process for increasing bandwidth according to another exemplary embodiment of the present invention. In the process 900, in block 901, a first signal may be received at a first mobile device. In block 902 it may be determined whether a bandwidth increase is desired and if not, the process returns to block 901. If a bandwidth increase is desired, then in block 903 support may be requested by the first mobile device from capable devices in proximity to the first mobile device. In block 904 the first mobile device may receive one or more acknowledgments from at least one second mobile device offering to provide support. In block 905 the first mobile device may send each of the at least one second mobile devices synchronization information. In block 906 the at least one second signal from the at least one second device may be transferred from each of the at least one second mobile devices to the first mobile device. In block 907 receive diversity processing and/or MIMO processing may be performed by the first mobile device in synchronization with the at least one second mobile device.

Figure 10:
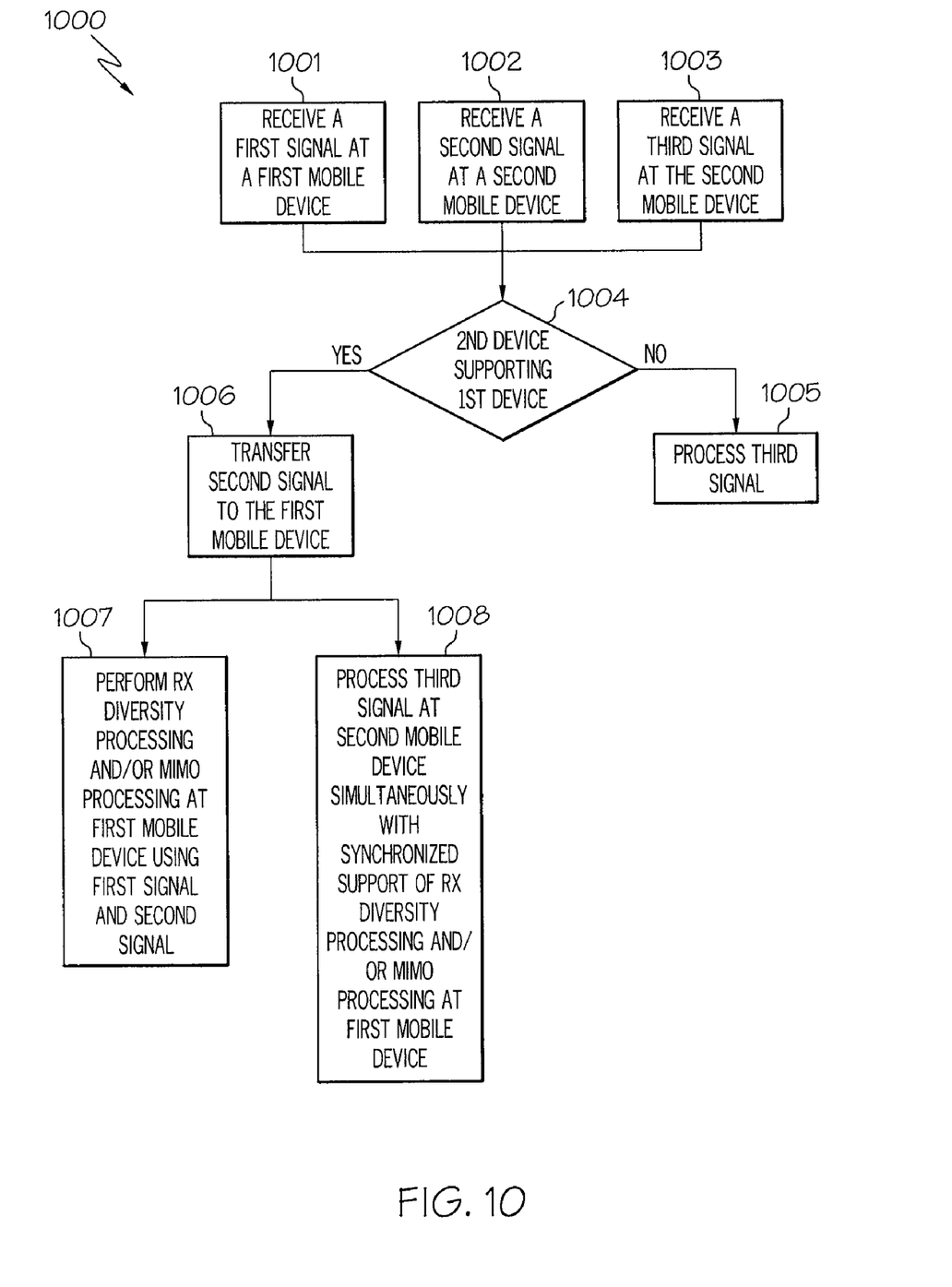
FIG. 10 is a flowchart of a process for simultaneous increased bandwidth support and signal processing according to an exemplary embodiment of the present invention.

FIG. 10 shows a flowchart of a process for simultaneous increased bandwidth support and signal processing according to another exemplary embodiment of the present invention. In the process 1000, in block 1001 a first signal may be received at a first mobile device, in block 1002 a second signal may be received at a second mobile device and in block 1003 a third signal may be received at the second mobile device. In block 1004 it may be determined if the second mobile device is supporting the first mobile device and if not, in block 1005 the second mobile device may process the third signal. If the second mobile device is supporting the first mobile device, then in block 1006, the second signal may transferred from the second mobile device to the first mobile device. Then in block 1007 receive diversity processing and/or MIMO processing may be performed at the first mobile device using the first signal and the second signal. Concurrently, in block 1008 the third signal may be processed at the second mobile device simultaneously with synchronized support of receive diversity processing and/or MIMO processing at the first mobile device.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:
1. A mobile device comprising:
an antenna, the antenna being capable of receiving a signal;
a processor, the processor being capable of:
    determining that a bandwidth increase is necessary for processing the signal;
    in response to determining a bandwidth increase is necessary for processing the signal, requesting support from at least one second mobile device in proximity to the mobile device;
    receiving one or more acknowledgements from at least one second mobile device;
    initiating communication of synchronization information to each of the at least one second mobile devices;
an interface, the interface being capable of receiving, from the at least one second mobile device, a second signal in synchronization with the signal; and an application, the application configured to perform receive diversity processing using the signal and the second signal.

2. The device according to claim 1, wherein the interface comprises a high bandwidth, low latency interface.

3. The device according to claim 1, wherein the interface comprises one of an Ultra Wideband (UWB) interface, a microwave interface, a Worldwide Interoperability for Microwave Access (WiMAX) interface, or a wireless Universal Serial Bus (USB) interface.

4. The device according to claim 1, further comprising the interface being capable of transferring the signal to a second mobile device for receive diversity processing of the signal and the second signal at the second mobile device in synchronization with the mobile device.

5. The device according to claim 1, further comprising the interface being capable of receiving the second signal from a second mobile device for receive diversity processing of the signal and the second signal at the mobile device in synchronization with the second mobile device.

6. The device according to claim 1, wherein the mobile device comprises one of a portable computer, a personal digital assistant (PDA), a mobile phone, an audio data receiver, a video data receiver, a satellite data receiver, or an electronic game.

7. The device according to claim 1, wherein the mobile device processes a third signal during the receive diversity processing of the signal and the second signal in synchronization.

8. The device according to claim 7, wherein the mobile device processes a telecommunications signal during the receive diversity processing of the signal and the second signal in synchronization.

9. The device according to claim 1, wherein the second signal comprises a derivative signal from the signal, the receive diversity processing being performed in synchronization on the signal and the derivative signal.

10. A mobile device comprising:
an antenna, the antenna being capable of receiving a signal;
a processor, the processor being capable of:
  determining bandwidth support increase is necessary for processing the signal;
  in response to determining a bandwidth increase is necessary for processing the signal, requesting support from at least one second mobile device in proximity to the mobile device;
  receiving one or more acknowledgements from at least one second mobile device;
  initiating communication of synchronization information to each of the at least one second mobile devices;
an interface, the interface being capable of receiving, from the at least one second mobile device, a second signal in synchronization with the signal; and
an application, the application configured to perform receive diversity processing using the signal and the second signal when the second signal comprises a derivative signal from the first signal and multiple input multiple output (MIMO) processing using the signal and the second signal when the second signal comprises a signal containing information different from the signal.

11. The device according to claim 10, wherein the interface comprises a high bandwidth, low latency interface.

12. The device according to claim 10, wherein the interface comprises one of an Ultra Wideband (UWB) interface, a microwave interface, a Worldwide Interoperability for Microwave Access (WiMAX) interface, or a wireless Universal Serial Bus (USB) interface.

13. The device according to claim 10, further comprising the interface being capable of transferring the signal to a second mobile device for MIMO processing of the signal and the second signal at the second mobile device in synchronization with the mobile device.

14. The device according to claim 10, further comprising the interface being capable of receiving the second signal from a second mobile device for MIMO processing of the signal and the second signal at the mobile device in synchronization with the second mobile device.

15. The device according to claim 10, wherein the mobile device comprises one of a portable computer, a personal digital assistant (PDA), a mobile phone, an audio data receiver, a video data receiver, a satellite data receiver, or an electronic game.

16. The device according to claim 10, wherein the mobile device processes a third signal during the MIMO processing of the signal and the second signal in synchronization.

17. The device according to claim 16, wherein the mobile device processes a telecommunications signal during the MIMO processing of the signal and the second signal in synchronization.

18. The device according to claim 10, wherein the second signal comprises at least one second signal containing information different from the signal, the MIMO processing being performed in synchronization on the signal and the at least one second signal containing information different from the signal.

19. A method for receive diversity and multiple input multiple output (MIMO) processing in synchronization between at least two devices comprising:
receiving a first signal at a first mobile device;
determining that a bandwidth increase is necessary for processing the first signal;
in response to determining a bandwidth increase is necessary for processing the first signal, requesting support from at least one second mobile device in proximity to the mobile device;
receiving one or more acknowledgements from at least one second mobile device;
initiating communication of synchronization information to each of the at least one second mobile devices;
receiving at least one second signal at the at least one second mobile device;
transferring the at least one second signal to the first mobile device;
performing receive diversity processing using the first signal and the at least one second signal when the at least one second signal comprises a derivative signal from the first signal; and
performing MIMO processing using the first signal and the at least one second signal when the at least one second signal comprises a signal containing information different from the first signal.

* * * * *